W. C. WHITT, DEC'D.
F. S. WHITT, ADMINISTRATRIX.
MANUALLY OPERATED VEHICLE.
APPLICATION FILED FEB. 1, 1917.
1,232,416.
Patented July 3, 1917
3 SHEETS—SHEET 1.
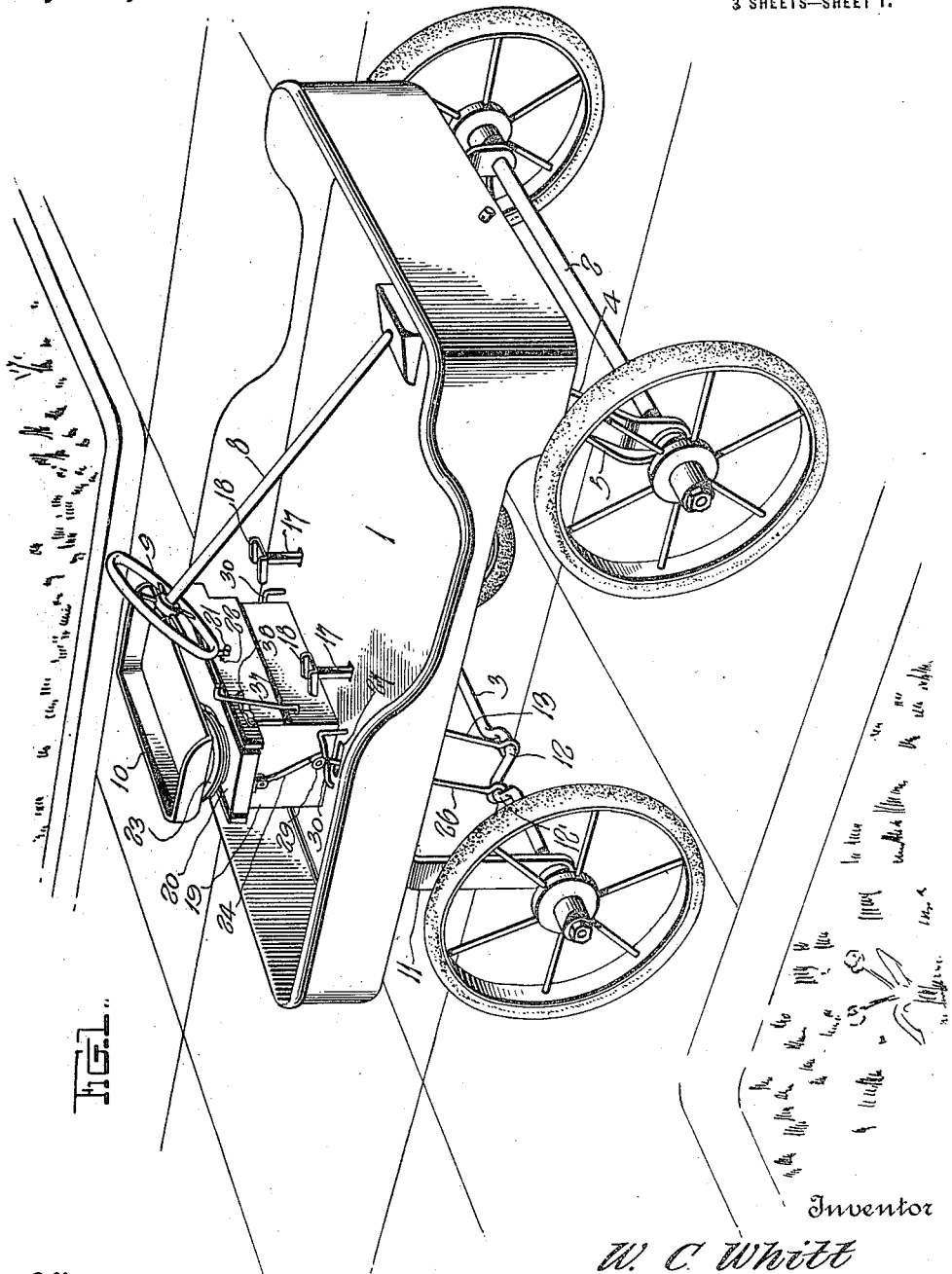
Inventor
W. C. Whitt
Witness
S. H. Woodard
By
Attorneys

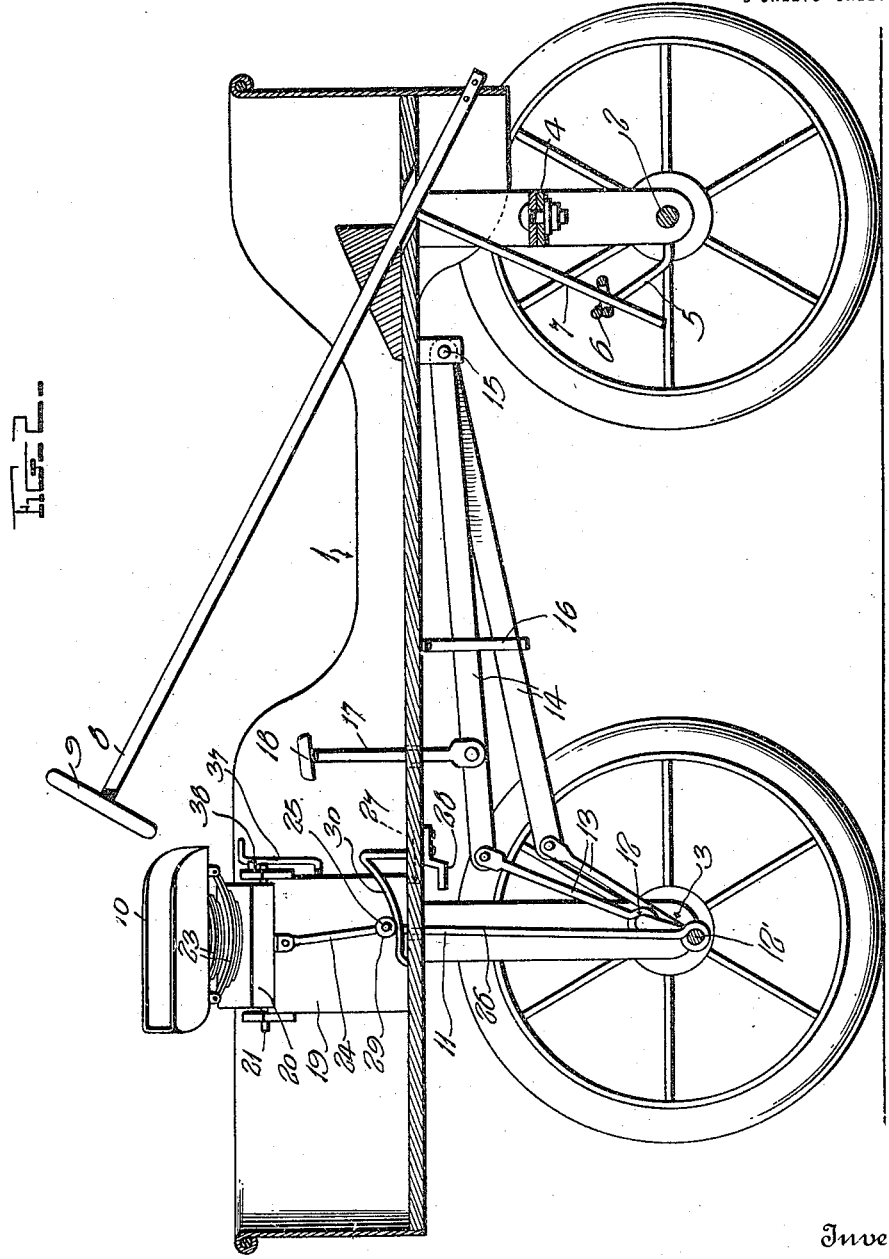

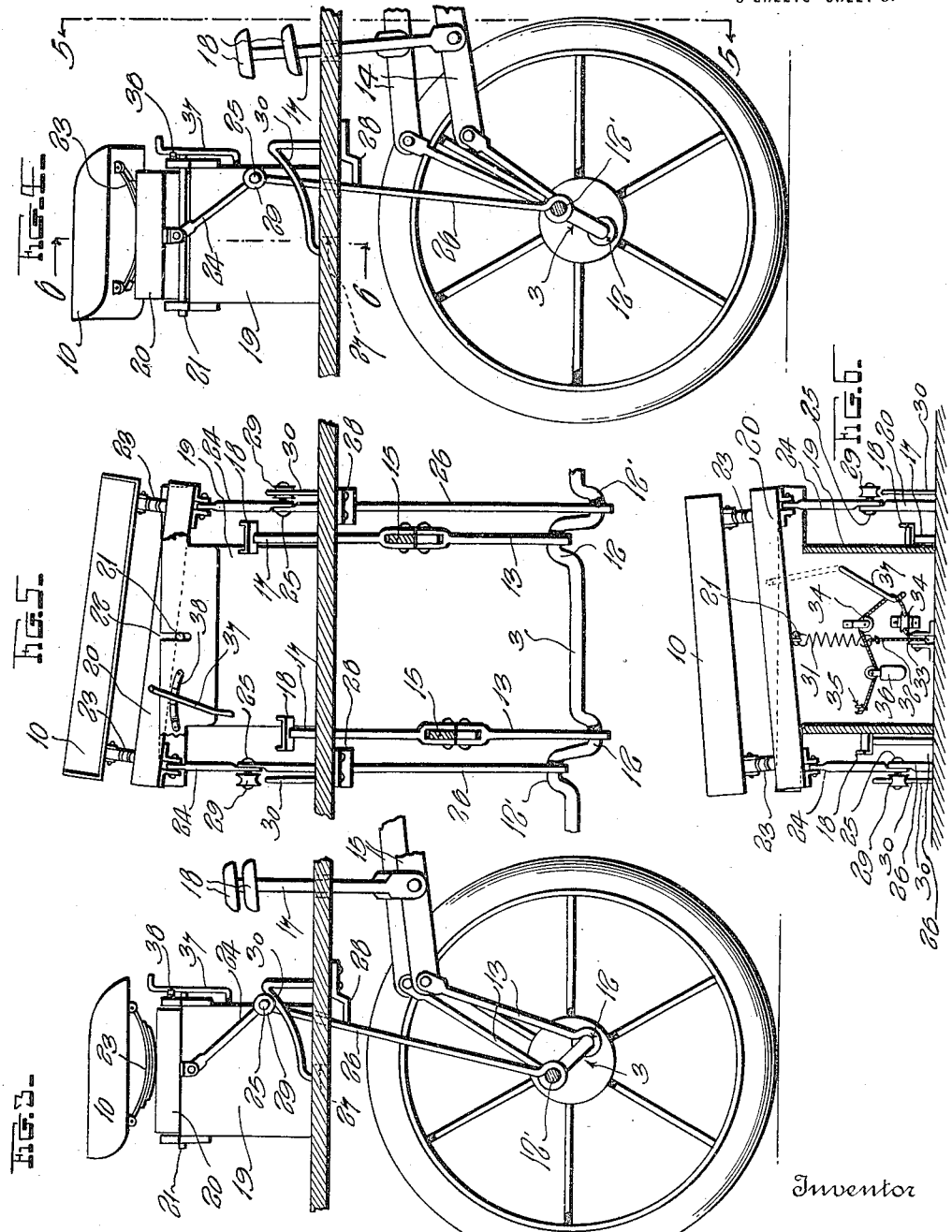

UNITED STATES PATENT OFFICE.

WILLIAM C. WHITT, OF FLORALA, ALABAMA; FRANCES S. WHITT ADMINISTRATRIX OF SAID WILLIAM C. WHITT, DECEASED.

MANUALLY-OPERATED VEHICLE.

1,232,416. Specification of Letters Patent. Patented July 3, 1917.

Application filed February 1, 1917. Serial No. 145,921.

*To all whom it may concern:*

Be it known that I, WILLIAM C. WHITT, a citizen of the United States, residing at Florala, in the county of Covington and State of Alabama, have invented certain new and useful Improvements in Manually-Operated Vehicles; and I do declare the following to be a full, clear, and exact description of the invention, such as will enable others skilled in the art to which it appertains to make and use the same.

My invention has for its object to so improve upon the construction of foot operated vehicles as to permit the shifting of the operator's weight in pressing first one pedal and then the other, to assist in propelling the device.

With the foregoing general object in view, the invention resides in certain novel features of construction and in unique combinations of parts to be hereinafter fully described and claimed, the descriptive matter being supplemented by the accompanying drawings which constitute a part of this application and in which:

Figure 1 is a perspective view of the improved vehicle;

Fig. 2 is a central vertical longitudinal section thereof;

Figs. 3 and 4 are detail longitudinal sections through the rear portion of the vehicle showing more particularly the operation of the connections between the seat and the rear axle;

Fig. 5 is a vertical transverse section on the plane of the line 5—5 of Fig. 4; and, Fig. 6 is a rear elevation of the seat and its supporting box, the latter being shown in section to more clearly illustrate the interior arrangement of parts.

In the drawings above briefly described, the numeral 1 designates a suitably shaped body carried on front and rear wheel supported axles 2 and 3, said front axle being mounted on a horizontally swinging bolster 4 capable of turning from side to side to steer the vehicle. A transverse rod 5 is secured at its ends to the ends of the bolster 4 and at its center is bent to form an eye 6 loosely receiving therein a crank arm 7 which depends from an inclined steering post 8 having at its rear end a steering wheel or the like 9 disposed adjacent the operator's seat 10.

The rear axle 3 is rotatably mounted in the lower ends of suitable bearing arms or the like 11, said axle having pairs of opposed cranks 12 and 12'. The lower ends of vertical links 13 are mounted on the cranks 12, the upper ends of said links being pivoted to the rear ends of a pair of vertically moving levers 14 fulcrumed at 15 to the bottom of the body 1 and guided in their vertical movement by parallel arms 16 secured to said bottom and disposed on opposite sides of said levers. Vertical bars 17 are pivoted to the levers 14 adjacent the rear ends of the latter and rise slidably through openings in the bottom of the body 1, the upper ends of said bars having pedals 18 to receive thereon the feet of the operator sitting upon the seat 10 so that by forcing downwardly on first one pedal and then the other, he may propel the vehicle. During this operation, it is obvious that when the person riding upon the machine forces downwardly with his right foot, his weight will be shifted toward the left end of the seat 10, and similarly, when he forces down with his left foot, his weight is shifted toward the right hand end of the seat. It is my intention to utilize this shifting weight to assist in propelling the vehicle and to this end I employ the novel features of construction now to be described.

A seat-supporting box 19 rises from the bottom of the body 1 near the rear end thereof, the front and rear sides of said box extending above the ends thereof and receiving therebetween a horizontal seat base 20 either end of which may tilt upwardly, the center of said base having on its under side a guide rod 21 extending longitudinally of the vehicle and received at its ends in vertical notches 22 formed in the upper edges of the front and rear sides of the box 19, said rod and notches preventing endwise shifting of the base. The seat 10 is mounted upon the base 20 by means of suitable springs 23 so that the vibration of said base caused by the means to be described will not be objectionable to the operator.

An upper pair of links 24 are pivoted at their upper ends to the ends of the base 20, the lower ends of said links being pivotally joined at 25 to the upper ends of a lower pair of links 26 mounted at their ends on the cranks 12'. The upper ends of the links 26 project through slots 27 in the bottom of the body 1 and fulcrums 28 are secured to said bottom at the front ends of said slots in position to be struck by the links 26 as the cranks 12' approach the limits of their upward movement, the parts then standing as shown in Fig. 3. As the crank now moves forwardly, it rocks the link 26 around the fulcrums 28 and thus throws the upper end of said link rearwardly so that the link 24 connected with said link 26 is moved toward a vertical position, thus raising the end of the seat base 20 to which said link 24 is connected. By the time this takes place, the weight of the operator has been shifted to this end of the base 20 with the result that his weight will force downwardly and exert a tendency to turn the crank 12 forwardly, thus assisting in propelling the vehicle.

Rollers 29 are mounted on the pivots 25 and travel on inclined tracks 30 as the links 24 swing forwardly before the links 26 are brought into contact with their respective fulcrums 28.

Due to the arrangement of parts above described, it will be obvious that the ends of the seat are raised alternately and that this is not done by a direct upward push of the crank 12', but by the lever action of the links 26. This action is capable of raising a heavy load without noticeably checking the speed of the vehicle and in some cases it is therefore desirable to supplement the weight of the operator by a spring 31 which exerts its tension downwardly upon the center of the base 20 to which it is secured at its upper end, said spring being located in the box 19. The lower end of this spring 31 is connected to a cable 32 which passes under a sheave 33 carried by the bottom of the body 1 and around a pair of vertically spaced sheaves 34 carried by the front side of the box, said cable being secured at 35 to said front side at a point spaced from the uppermost sheave 34. A weight 36 is mounted on the cable 32 between the anchored end 35 thereof and said upper sheave 34 to normally remove slack from said cable, while slidably connected with the latter between the sheaves 34 is the lower end of a lever 37 whose upper end is disposed on the exterior of the box 19 and is equipped with suitable means 38 for holding it in adjusted position, it being obvious that when this lever is forced in the proper direction, the spring 31 will be placed under tension whereas moving said lever in the other direction will produce the opposite result.

The tension of the spring 31 is overcome by the means above described for alternately raising the opposite ends of the base 20 but when this means ceases to exert a raising action, the spring comes into play together with the weight of the operator to force the seat again downwardly with the result that the links 24 and 26 impart forward movement to the cranks 12 as above described.

From the foregoing, taken in connection with the accompanying drawings, it will be clear that although the invention is of comparatively simple and inexpensive nature, it will be highly efficient and durable. For these reasons, the construction shown and described constitutes the preferred form of the improved vehicle, but it is to be understood that within the scope of the invention as claimed, numerous changes may be made without sacrificing the principal advantages.

I claim:—

1. A manually operated vehicle including a rear axle having a pair of opposed cranks, foot pedals connected with said axle for turning the same, a seat mounted on the vehicle body for tilting toward the sides thereof, a pair of upper links pivoted to and depending from the ends of said seat, a pair of lower links pivoted at their upper ends to the lower ends of said upper links and mounted at their lower ends on said cranks, and fulcrums for said lower links arranged to be struck thereby as the cranks approach the limit of their upward movement.

2. A manually operated vehicle including a rear axle having a pair of opposed cranks, foot pedals connected with said axle for turning the same, a seat mounted on the vehicle body for tilting toward the sides thereof, a pair of upper links pivoted to and depending from the ends of said seat, a pair of lower links pivoted at their upper ends to the lower ends of said upper links and mounted at their lower ends on said cranks, fulcrums for said lower links arranged to be struck thereby as the cranks approach the limit of their upward movement, rollers carried by the pivotally connected ends of the two pairs of links, and inclined tracks upon which said rollers travel.

In testimony whereof I have hereunto set my hand in the presence of two subscribing witnesses.

WILLIAM C. WHITT.

Witnesses:
A. M. McLENDON,
F. M. GALLOWAY.

Copies of this patent may be obtained for five cents each, by addressing the "Commissioner of Patents, Washington, D. C."